United States Patent [19]

Zuranski et al.

[11] Patent Number: 4,646,325
[45] Date of Patent: Feb. 24, 1987

[54] INDEX DECODER FOR DIGITAL MODEMS

[75] Inventors: Edward S. Zuranski, Largo; Kenneth Martinez, Pinellas Park, both of Fla.

[73] Assignee: Paradyne Corporation, Largo, Fla.

[21] Appl. No.: 723,264

[22] Filed: Apr. 15, 1985

[51] Int. Cl.[4] .......................... H04L 5/12; H04L 23/02
[52] U.S. Cl. ........................................ 375/39; 375/14; 375/81; 329/112
[58] Field of Search ...................... 375/39, 52, 53, 78, 375/79, 80, 81, 12, 14; 370/20, 29; 329/110, 112; 333/18

[56] References Cited

U.S. PATENT DOCUMENTS

| | | | |
|---|---|---|---|
| 3,518,680 | 6/1970 | McAuliffe | 375/39 |
| 3,675,139 | 7/1972 | Guest | 375/81 |
| 4,024,342 | 5/1977 | Croisier et al. | 375/39 |
| 4,317,210 | 2/1982 | Dekker et al. | 375/80 |
| 4,438,524 | 3/1984 | Muilwijk | 375/80 |

Primary Examiner—Robert L. Griffin
Assistant Examiner—Stephen Chin
Attorney, Agent, or Firm—Kane, Dalsimer, Kane, Sullivan & Kurucz

[57] ABSTRACT

In a QAM digital modem decoder section, the received signals (after equalization) are transposed to a preselected quadrant of the signal constellation to generate an index pointer. The index pointer and the actual quadrant are used to decode the QAM signals. The index pointer is also used to update the equalizer taps and to operate a phase tracking loop used to reduce or eliminate phase jitter.

3 Claims, 1 Drawing Figure

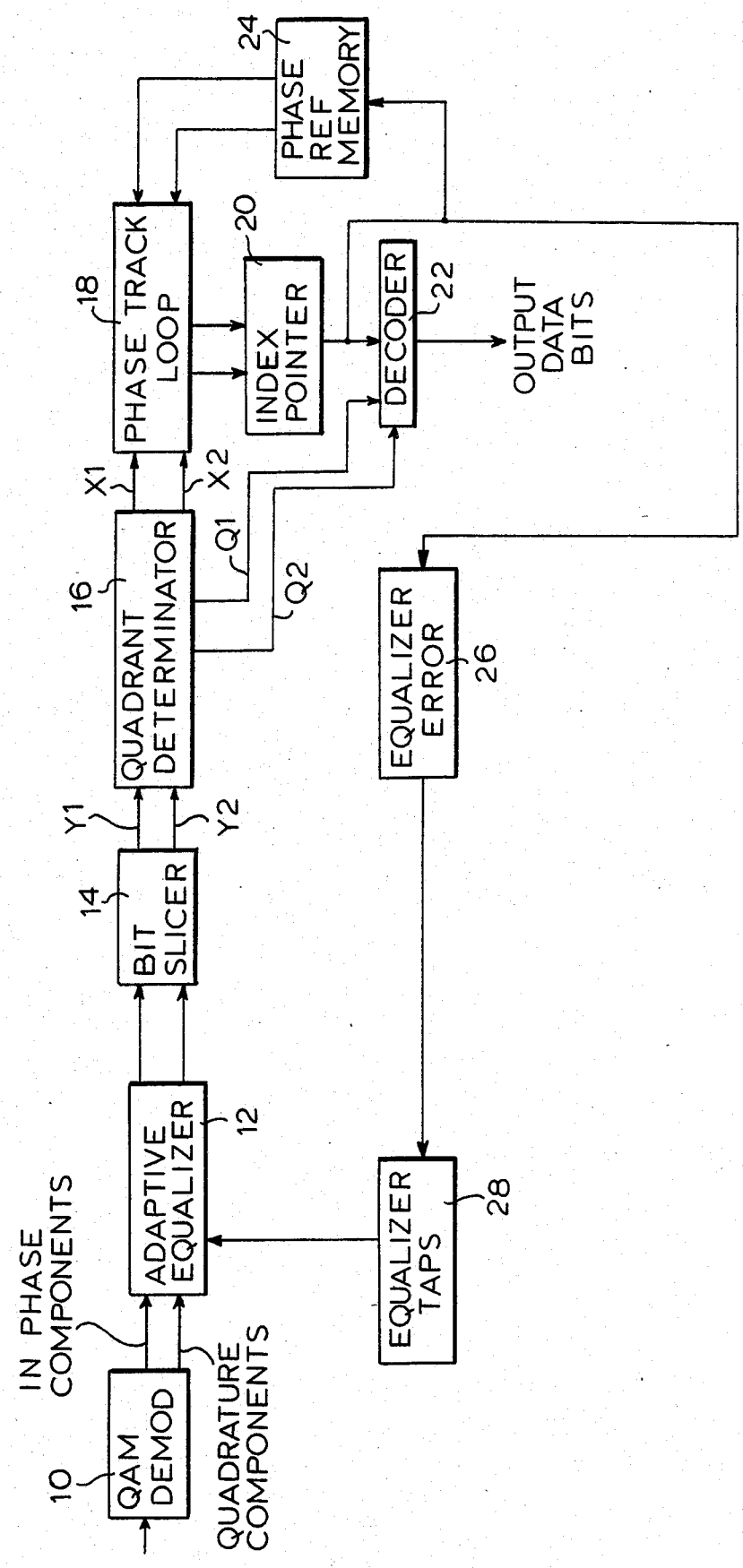

INDEX DECODER FOR DIGITAL MODEMS

BACKGROUND OF THE INVENTION a. Field of Invention

This invention pertains to the receiver section of a digital modem and more particularly to an improved modem section for receiving and decoding quadrature amplitude modulated data signals.

b. Description of the Prior Art

Digital data signals are frequently encoded using a quadrature amplitude modulation (QAM) scheme for high speed and reliability. Such signals are characterized by an in-phase and a quadrature component and may be illustrated as points on a Cartesian coordinate system with the above components defining the orthogonal coordinates of the points. The points in each of the four quadrants form identical patterns in virtually all the signal constellations (or eye patterns) presently in use. Yet in all the present modem receiver sections, provisions are made for all the points of signal constellations regardless of their inherent symmetry leading to unduly complex implementations. This is especially true of microprocessor-based modem receivers in which complex look-up tables are used by decoding, as well as for various error correction functions (described more fully below). These look-up tables must provide proper values for all the points of the constellation. In addition, various manipulations on the signal components are performed (such as additions and multiplication). Since at least one of the components of all the points outside the first quadrant is negative, special provisions must be made for handling negative numbers, leading to further complications.

OBJECTIVES AND SUMMARY OF THE INVENTION

A primary objective of the present invention is to provide a modem receiver adapted to manipulate the points of a signal constellation located in a single quadrant.

A further objective is to provide a modem receiver in which the components of the received signals are easier to manipulate.

Other objectives and advantages of the invention shall become apparent from the following description of the invention. According to this invention, a modem receiver section is provided with a means for determining the quadrant of each received point and means for translating said received point to the first quadrant. The coordinates of the translated point are used for decoding, error correction, adaptive equalization and so on. The quadrant of the actual received point is also used for final decoding.

BRIEF DESCRIPTION OF THE DRAWINGS

The drawing shows the elements of a modem decoder section constructed in accordance with the present invention.

DETAILED DESCRIPTION OF THE INVENTION

Referring now to the drawing, a modem decoder section comprises a QAM demodulator 10 which converts received signals into corresponding in-phase and quadrature components which are fed into an adaptive equalizer 12. The equalized components are fed to a bit slicer 14 which samples the equalizer outputs at a predetermined sampling rate. The outputs Y1, Y2 of the slicer representing the sampled in-phase and quadrature components of the received signals are fed to a quadrant determinator 16 which generates two signals Q1 and Q2 which define the quadrant of each received signal. The quadrant determinator further generates signals X1 and X2 which correspond respectively to the first quadrant equivalent of Y1 and Y2. In other words, X1 and X2 are equal to the absolute values of Y1 and Y2 respectively. The operation of the quadrant determinator 16 is further illustrated in the table below:

| Y1 | Y2 | Q1 | Q2 | X1 | X2 |
|----|----|----|----|----|----|
| 1  | 1  | 0  | 0  | 1  | 1  |
| -1 | 1  | 0  | 1  | 1  | 1  |
| -1 | -1 | 1  | 0  | 1  | 1  |
| 1  | -1 | 1  | 1  | 1  | 1  | wherein quadrants 1, 2, 3 and 4 are designated by Q1, Q2 by binary numbers 00, 01, 10 and 11 respectively.

Outputs X1 and X2 are fed into a phase tracking loop 18 provided for eliminating phase jitter. A complete description of this loop is found in commonly assigned application Ser. No. 407,,451 filed Aug. 12, 1982, entitled "Phase Tracking Loop for Digital Modems", now U.S. Pat. No. 4,532,640.

The phase-corrected signals from loop 18 are then fed to an index pointer 20 which comprises a look-up table for generating a preselected index number for each incoming pair of signals. The index number is then used by a decoder 22 together with signals Q1 and Q2 to generate an output data bit stream corresponding to the signals detected by QAM demodulator 10. For example, the decoder may comprise a look up table for generating the output data bits corresponding to the first quadrant index number from 20 and means for adding further data bits corresponding to quadrant signals Q1 and Q2. The index number from index pointer 20 is also provided to a phase reference number memory 24 which generates a corresponding complex phase reference number required by the phase tracking loop 18 as described in the above-mentioned disclosure.

The index number from index pointer 20 is further fed into an equalizer error circuit 26 which contains a lookup table referenced by the index pointer 20 that contains the ideal coordinate references of the first quadrant of the constellation. The arithmetic difference between X1, X2 and the ideal reference for that point is a first quadrant error signal. Circuit 26 rotates the first quadrant equalizer error back to the original quadrant using the information contained in Q1, Q2 and provides said error signal to an equalizer tap circuit 28 for updating the equalizer.

It is clear from the above that except for elements 22, 24 and 26 the decoder of the FIGURE does not depend on any particular QAM signal constellation. Therefore modems using different QAM constellations (and therefore different bit rates) may be made using essentially identical decoder sections. Only the decoder look-up table 22, phase reference memory 27 and equalizer error circuit 26 need be changed for each particular constellation with an appropriate set of constants. Alternately, a decoder may be provided with several memories 22, 22' 22"; 24, 24', 24"; 26, 26', 26"; and means for selecting one set of these memories for a particular constellation.

Obviously, numerous other modifications may be made to the invention without departing from its scope as defined in the appended claims.

What is claimed is:

1. In a digital modem for receiving QAM signals having in-phase and quadrature components which may be represented as points disposed at two radial distances from an origin and in four quadrants of a signal constellation, a decoder section comprising:

an adaptive equalizer with adjustable taps for equalizing the received signal;

quadrant detecting means for determining a quadrant corresponding to an equalized signal and for generating a quadrant signal indicative of said quadrant;

intermediate signal generating means for generating an intermediate in phase and an intermediate quadrature signal corresponding to said equalized signal, said intermediate signals being disposed in a preselected quadrant;

index pointer means for generating an index pointer corresponding to said intermediate signals;

decoder means for generating output binary bits corresponding to said index pointer and said quadrant signal, said decoder means having a look-up table;

an error signal generator for generating a control signal in accordance with said index pointer; and an equalizer tap adjustor for adjusting said taps in accordance with said control signal.

2. The decoder section of claim 1 wherein said intermediate in-phase and quadrature signals are the absolute values of the in-phase and quadrature components of the received signals.

3. The decoder section of claim 1 further comprising a phase correcting loop for correcting the phase of the received signal, said phase correcting loop being dependent on phase reference numbers selected in accordance with said index pointer.

* * * * *